May 28, 1946.    H. L. KNAPP    2,401,165
METALWORKING MACHINE
Filed May 29, 1944    5 Sheets-Sheet 1

FIG. 1.

INVENTOR.
Harry L. Knapp,
BY
Gray & Smith
ATTORNEYS.

May 28, 1946.  H. L. KNAPP  2,401,165
METALWORKING MACHINE
Filed May 29, 1944  5 Sheets-Sheet 2

Fig. 2

INVENTOR.
Harry L. Knapp.
BY
Gray & Smith
ATTORNEYS.

May 28, 1946.　　　H. L. KNAPP　　　2,401,165
METALWORKING MACHINE
Filed May 29, 1944　　　5 Sheets-Sheet 3

INVENTOR.
Harry L. Knapp.
BY
Gray & Smith
ATTORNEYS.

May 28, 1946.  H. L. KNAPP  2,401,165
METALWORKING MACHINE
Filed May 29, 1944  5 Sheets-Sheet 5

INVENTOR.
Harry L. Knapp.
BY
Gray & Smith
ATTORNEYS.

Patented May 28, 1946

2,401,165

UNITED STATES PATENT OFFICE 2,401,165

METALWORKING MACHINE

Harry L. Knapp, Detroit, Mich.

Application May 29, 1944, Serial No. 537,832

19 Claims. (Cl. 51—50)

This invention relates to metal working machines, such as machines for carrying out grinding, milling, reaming, shaping and other machining operations in which it is not only desirable to provide traverse feed of the tool and work relatively to each other in an axial direction but also to provide for relative feed of the work and tool in a transverse direction.

For the purpose of exemplifying the invention one type of machining operation has been selected in the present case for illustrative purposes, and accordingly the invention has been embodied in a single spindle machine for performing internal grinding operations on a tubular workpiece. Where the machine, embodying the invention, is to be used for carrying out other machining operations suitable adaptations or modifications may be made in order to accomplish these purposes.

An object of the present invention is to provide a metal working machine having improved mechanism for accomplishing the traverse feed of the tool and work, one relatively to the other and in an axial direction, together with improved means for feeding the work transversely relatively to the tool during the machining operation.

A further object of the invention is to provide a machine of the foregoing kind which is relatively simple and compact in construction, easy to operate, capable of performing precision operations with a minimum time cycle required to complete an operation, and which will have increased productive capacity.

Another object of the invention is to provide a metal working machine having improved means for controlling and manipulating the work carrying support or spindle whereby the latter may be readily shifted into and out of operative position, the workpiece gripped or released, and the work holder moved laterally relatively to the tool, all such operations being accomplished easily and effectively by means of a single conveniently accessible manual control.

Still a further object of the invention is to provide a machine of the above mentioned class in which improved means is provided for accurately guiding the work holder assembly into and out of operative position with respect to the tool and in which the gripping or release of the work is controlled by this movement, the guide mechanism and associated support for the work holder being so constructed in improved manner as to permit the work to be shifted or fed toward the tool during operation.

More particularly it is an object of the invention to provide a work holder support guided for longitudinal movement by parallel guide shafts or rods and in which the improved construction is such that pivotal motion may be imparted to the work holder support about the axis of one guide shaft so as to shift the workpiece laterally toward and from the tool.

Also a particular object of the invention is to provide improved means for actuating the collet or work holding device to grip or release the work automatically by traverse movement of the work holder support on its guides toward and from the tool.

Still a further object of the invention is to provide improved means for feeding a grinding wheel toward and from the work and controlling the depth of feed thereof with respect to the work. Also an object is to provide a fixture on the machine carrying a diamond wheel dresser which is shiftable into position for dressing the grinding wheel and thereafter shiftable to one side to permit operation of the machine without interference.

Other objects of this invention will appear in the following description and appended claims, reference being had to the accompanying drawings forming a part of this specification wherein like reference characters designate corresponding parts in the several views.

Fig. 3 is an enlarged transverse sectional elevation taken substantially through lines 3—3 of Fig. 2 looking in the direction of the arrows.

Fig. 5 is a fragmentary front elevation, partly in section, of the diamond wheel dresser.

Fig. 6 is a side elevation of the construction shown in Fig. 5.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
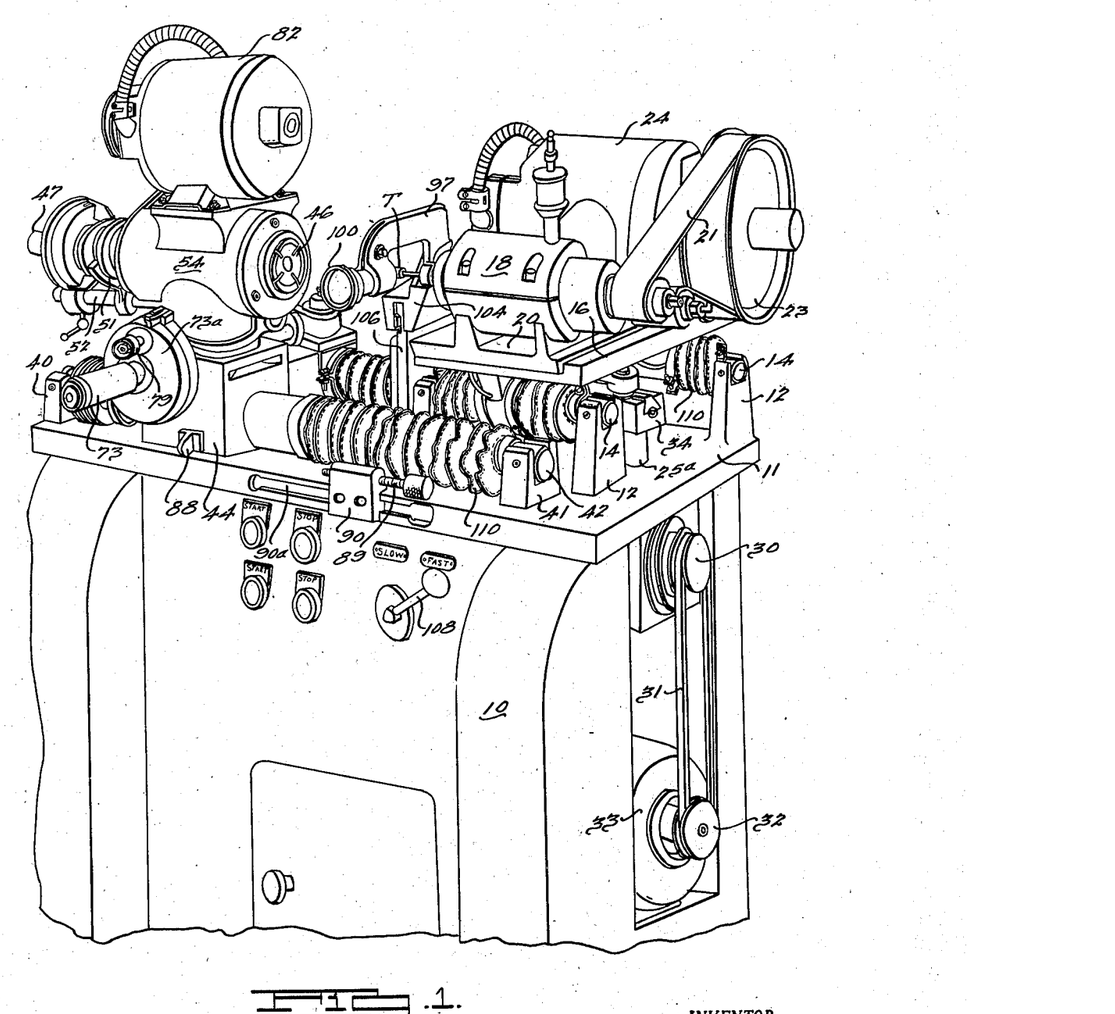
Fig. 1 is a fragmentary perspective view illustrating a machine embodying the present invention.

In the drawings there is illustrated, by way of example, a machine for performing internal grinding operations upon a tubular workpiece W through the medium of a grinding wheel T. The machine, as illustrated in Fig. 1, comprises a suitable upright supporting frame 10 upon which is rigidly mounted a platform or bed plate 11. Rising from the bed plate 11 at one end of the machine are longitudinally spaced pairs of stanchions 12 and 13 grooved or notched at their upper ends to receive a pair of transversely spaced longitudinally extending guide shafts 14 which are rigidly secured to the stanchions, see Figs. 2 and 7. Extending above these guide shafts is a horizontal platform or slide 16 having depending longitudinally extending bosses 15 bored to receive the guide shafts 14 and through the medium of which the platform 16 is slidable back and forth in a longitudinal direction. The supporting shank for the grinding wheel T is releasably clamped in conventional manner in a collet or chuck carried by a rotary tool carrying spindle 17 revoluble within a bearing member 18 secured through clamping members 19 and 19a to a base plate 20 adjustably bolted to the platform 16 within a transverse way therein. The tool carrying spindle 17 is driven through the medium of a belt 21 connected to a driven pulley 22 secured to the spindle and also connected to a driving pulley 23 secured to the armature shaft of an electric motor 24 mounted upon the platform 20.

Figure 2:
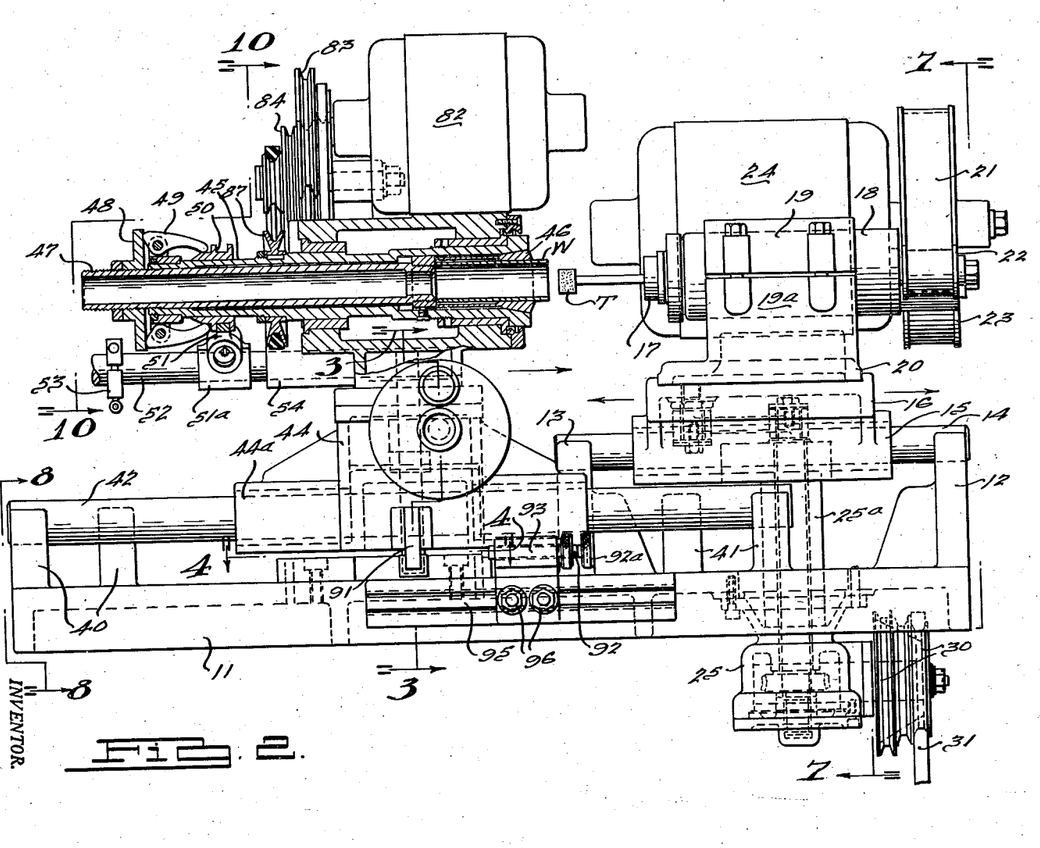
Fig. 2 is an enlarged front elevation, partly in section, of the upper part of the machine similar in all substantial respects to the machine of Fig. 1 although embodying some variations.
Figure 7:
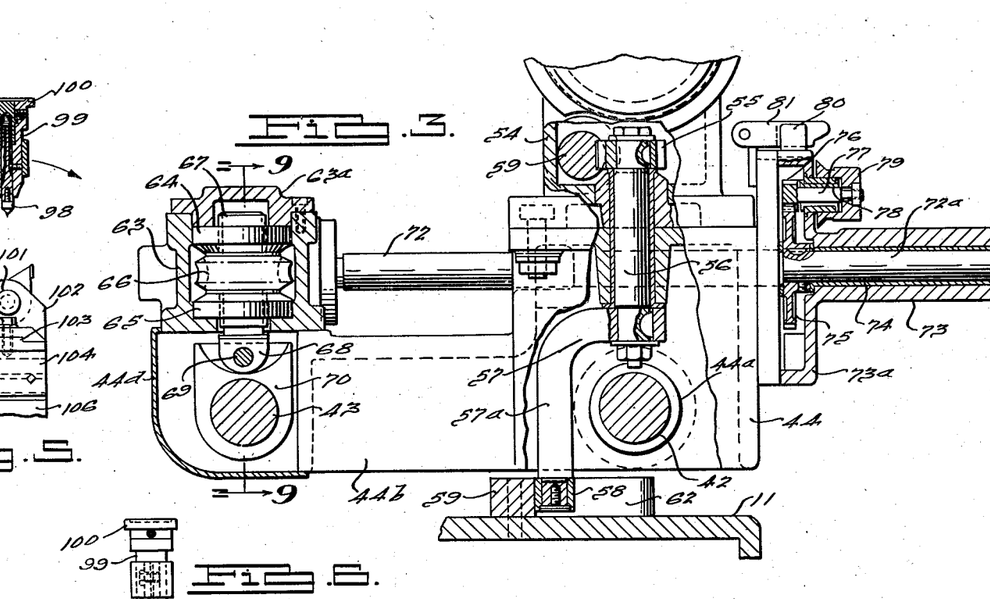
Fig. 7 is a sectional end elevation taken substantially through lines 7—7 of Fig. 2 looking in the direction of the arrows.
Figure 11:
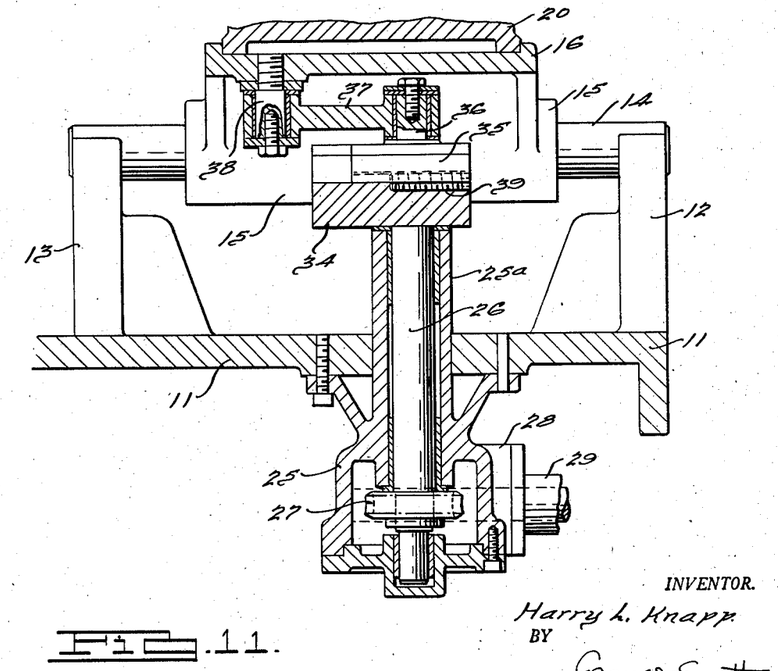
Fig. 11 is an enlarged sectional view taken substantially through lines 11—11 of Fig. 7 looking in the direction of the arrows.

Referring to Figs. 2, 7 and 11, a bracket 25 is bolted to the bottom of the bed plate 11, this bracket having a tubular portion 25a extending vertically through an aperture in the bed plate and providing a bearing for a rotary shaft 26. Secured to the lower end of this shaft is a worm gear 27 meshing with a pinion on a transversely extending shaft 29 supported in a suitable bearing carried by a member 28 secured to the bracket 25. The shaft 29 carries a plurality of pulleys 30 of different diameters through the medium of one or the other of which the shaft 29 may be driven at the proper speed by means of a belt 31 connected to a driving pulley 32 secured to the armature shaft of an electric motor 33 supported on the frame 10, see Fig. 1.

Fastened to the upper end of the shaft 26, see Figs. 7 and 11, is a head or block 34 which is rotatable with the shaft and which is provided with a dovetail way within which is adjustably mounted a slide member 35 adapted to be secured in fixed adjusted position with respect to the block 34. The slide member 35 carries a vertically extending crank pin 36 to which is fastened one end of a connecting rod 37, there being a bearing between the connecting rod and the pin 36 permitting the rod to turn upon the pin during operation. The opposite end of the connecting rod 37 is connected to and has a bearing upon a depending pin 38 threaded into the bottom of the slide or platform 16. As illustrated in Fig. 11, the slide member 35 may be secured in correct adjusted position to the head 34 of the shaft 26 through the medium of an adjusting screw 39. This screw is partially housed within a horizontally extending hole drilled in the head 34 and open at the top so that the threads of the adjusting screw will engage threads formed in a horizontally drilled hole in the member 35. Thus, by turning the adjusting screw 39 the slide member 35 may be shifted relatively to the head 34 so as to position the crank pin 36 eccentrically with respect to the shaft 26. In the neutral position of the parts shown by way of example in Fig. 11, since the pin 36 is here shown coaxial with the shaft 26, rotation of the shaft 26 and head 34 will not impart reciprocating motion to the connecting rod 37 for the purpose of shifting the slide 16 back and forth in a longitudinal direction. The throw of the connecting rod and the corresponding distance to which the slide will be shifted longitudinally upon the guide shafts 14 will thus depend upon the eccentric position of the pin 36 as determined by the position to which the slide member 35 is adjusted by means of the adjusting screw 39. It will, of course, be understood that the longitudinal reciprocating motion of the slide or platform 16 will be imparted to the tool carrying spindle 17, the spindle driving motor 24 and associated parts mounted upon the platform 20 which in turn is bolted in proper laterally adjusted position to the slide or platform 16.

Rising from the bed plate 11 are longitudinally spaced pairs of stanchions 40 and 41 (see Fig. 2), the stanchions of each pair being spaced transversely and notched or grooved at their upper ends to receive transversely spaced longitudinally extending guide shafts 42 and 43 rigidly secured thereto, (see also Figs. 6 and 7). These shafts as well as guide shafts 14 are preferably protected by means of dust shields or boots 11c. Arranged to slide longitudinally upon the guide shaft 42 is a housing support 44 having a longitudinally extending bearing boss 44a bored to slidingly receive the shaft 42. The housing 44 has an integral laterally extending arm extension 44b which, as later described, is slidingly guided upon the guide shaft 43 while at the same time supported for limited swinging movement in a vertical plane about the axis of the guide shaft 42.

Mounted in suitable bearings in the upper end of the housing support 44 is a rotary work spindle 45. The forward end of this spindle is constructed in any suitable or conventional fashion to receive a collet 46 which in turn receives the tubular workpiece W. The collet is of conventional kind and is provided with an external tapered portion cooperating with an internal tapered portion on the end of the spindle so that by shifting the collet longitudinally with respect to the spindle the collet may be contracted or expanded to grip or release the workpiece W. Extending through the work spindle is a shiftable collet operating tube 47 which has a threaded connection with the inner end of the collet and a bearing within the spindle so that the tube may be shifted longitudinally relatively to the spindle to open or close the collet. Adjustably secured to the rear end of the shift tube 47 is a thrust collar or disk 48 engageable by pivoted thrust fingers 49 operated in the usual manner through the medium of a wedge shaped collar 50 shiftable on the work spindle and annularly grooved to receive a shift fork 51 carried by a block 51a bored to receive a collet operating shaft 52 to which the block is fastened. By shifting the shaft 52 and hence the collar or sleeve 50 to the left in Fig. 2 to cause the collar to spread the thrust fingers 49 the latter will engage the disk 48 and shift the tube 47 rearwardly, thereby drawing the collet 46 into clamping engagement with the workpiece W. Adjustably secured in fixed position to the shaft 52 is a split ring or collar 53 positioned to engage the thrust disk 48 when the shaft 52 is shifted a predetermined distance to the right in Fig. 2. Thus, it will be seen that when the shaft 52 and, hence, the sleeve 50 is shifted to the right in Fig. 2 the collet will be opened and the workpiece will be released therefrom.

Figure 4:
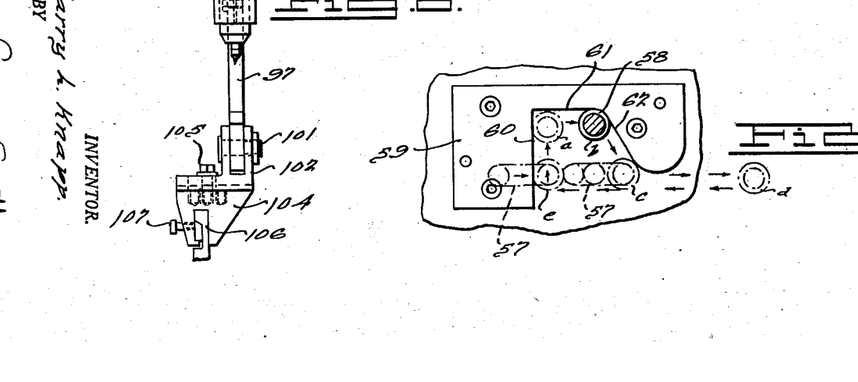
Fig. 4 is a horizontal section taken substantially through lines 4—4 of Fig. 2 looking in the direction of the arrows.

The shaft 52 is slidable longitudinally within a bearing in a bracket 54 bolted to the top of the housing support 44, see Figs. 2 and 3. The forward end of the slide shaft 52 is housed within an opening in the bracket 54 and is provided with rack teeth meshing with the teeth of a pinion 55 secured to the upper end of a vertical shaft 56 having a bearing within the bracket 54 and housing support 44. Secured to the lower end of the shaft 56 is a crank arm 57 provided with a depending crank extension 57a to the lower end of which is secured a cam roller 58. Cooperable with the cam roller 58 is a cam block or plate 59 bolted to the upper surface of the bed plate 11. The block is cut away, as illustrated in Fig. 4, to provide an opening formed with angularly extending cam walls or surfaces 60, 61 and 62 adapted to be engaged by the cam roller 58. Since the shaft 56 and the crank arm 57 attached thereto are carried by the housing support 44 which in turn is slidable longitudinally upon the guide shaft 42, it will be seen that during this longitudinal sliding motion the cam roller 58 at predetermined times will engage the cam surfaces of the cam block or plate 59 to impart rotative motion to the shaft 56. It will be apparent that when the shaft 56 is rotated, or partially so, in one direction the pinion 55 on this shaft will shift the shaft 52 longitudinally in one direction thereby shifting the collar or sleeve 50 on the work spindle to close the collet 46. Vice versa, when the shaft 56 is turned in the opposite direction the shaft 52 will be shifted in the opposite direction to bring the ring 53 into engagement with the disk 48 thereby opening the collet.

Referring to Fig. 4, the various positions of the cam roller 58 with respect to the cam block 59 are shown in full and dotted lines. The cam roller occupies the position shown at $a$ when the housing support 44 and work spindle 45 are in their rearward position with the collet 46 open preparatory to the insertion of a workpiece therein. After insertion of the workpiece the housing support 44 is shifted forwardly toward the grinding wheel, and during the initial part of this movement the cam roller $a$ travels along the wall 61 into engagement with the inclined cam surface 62. During this movement the collet remains open. During further travel of the sliding support 44 the cam roller travels over the cam surface 62 thereby turning the crank arm 57 resulting in shifting the shaft 52 rearwardly to close the collet into gripping engagement with the workpiece. The closing of the collet is accomplished during the travel of the cam roller 58 substantially from the position $b$ to the position $c$ after which the cam roller passes over the end of the cam surface 62 and is free to travel to the position shown at $d$ representing the extreme forward position of the work spindle. After completion of the grinding operation the support 44 is shifted in the opposite direction rearwardly, causing the cam roller to travel from the position $d$ to the position $e$ where it engages the wall 60 of the cam block. At this point during continued rearward travel of the support 44 to the starting position the cam roller will travel along the wall 60 from the position $e$ to the position $a$ thereby swinging the crank arm 57 so as to turn the shaft 56 in the opposite direction and shifting the shaft 52 forwardly to open the collet and release the work.

Figures 7, 8, 9:
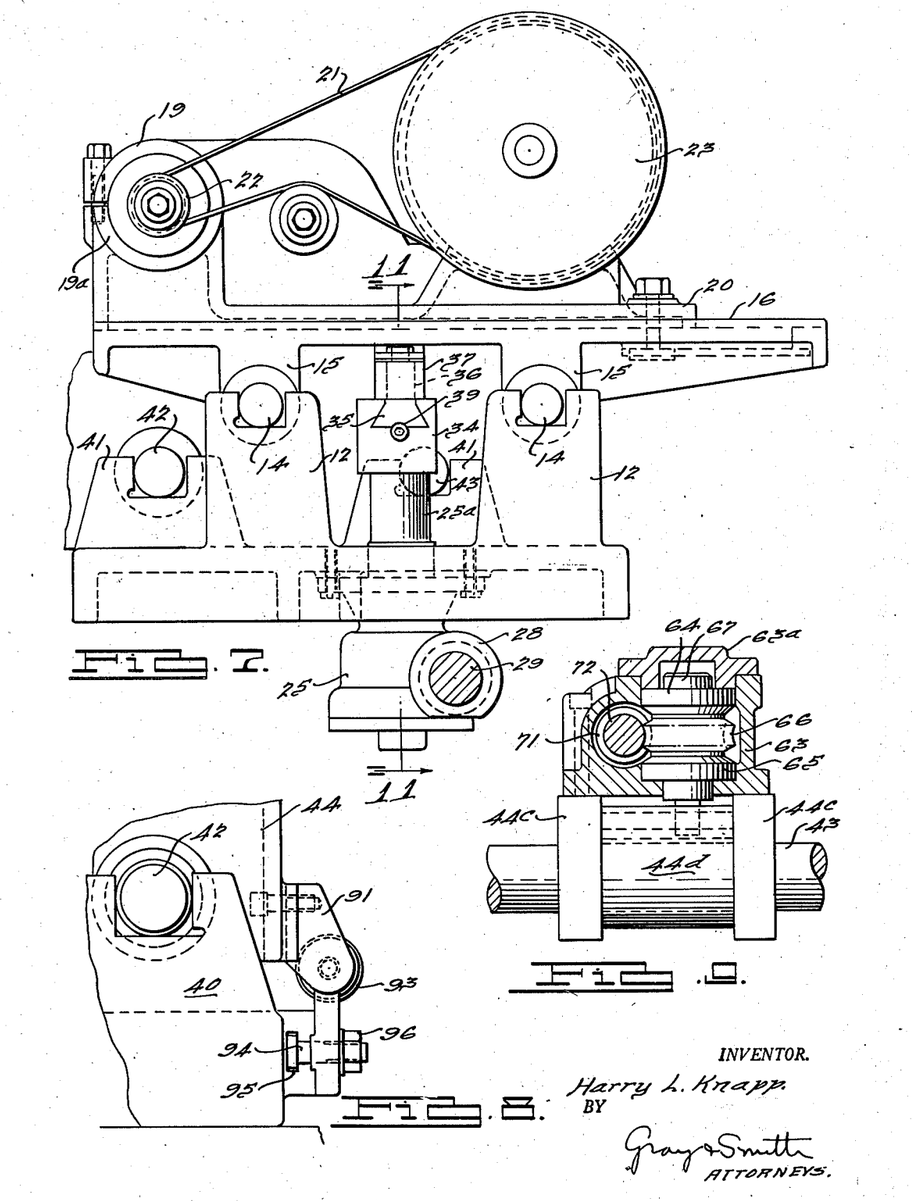
Fig. 8 is a fragmentary end elevation taken substantially through lines 8—8 of Fig. 2 looking in the direction of the arrows.
Fig. 9 is a sectional view taken substantially through lines 9—9 of Fig. 3 looking in the direction of the arrows.
Figure 10:
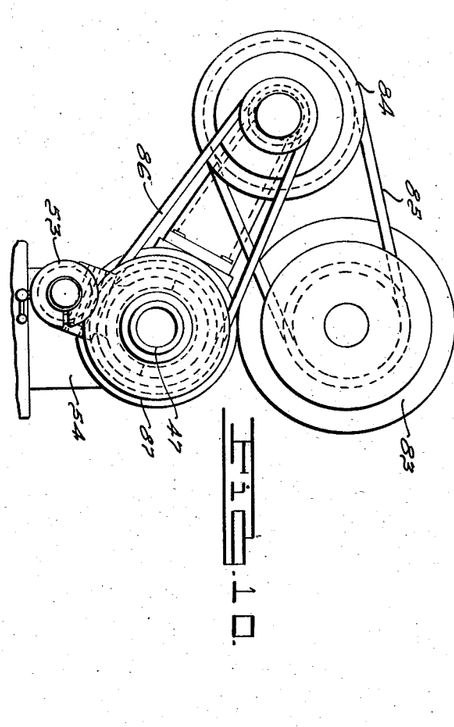
Fig. 10 is an end elevation taken substantially from lines 10—10 of Fig. 2 looking in the direction of the arrows.

As illustrated in Figs. 3 and 9, a gear housing 63 is rigidly secured to the outer end of the arm extension 44b of the housing support 44. The outer end of this arm is bifurcated at 44c and the space between the bifurcated ends is closed by means of a detachable closure plate 44d. The open top of the gear housing 63 is closed by means of a detachable cap 63a. Mounted within the gear housing 63 are vertically spaced annular thrust members 64 and 65 between which is positioned a worm gear 66 in thrust bearing engagement therewith. This gear is provided with internal threads engaging the external threads of a vertical shaft 67. Secured to the lower end of this shaft is a clevis 68 pivoted by means of a transverse pin 69 to a yoke 70 bored to have a sliding fit on the guide shaft 43. Meshing with the worm gear 66 is a pinion 71 fastened to the end of a shaft 72 extending transversely through the upper end of the housing support 44 and having a bearing therein.

From the foregoing construction it will be seen that the arm extension 44b of the sliding housing support 44 is guided longitudinally upon the guide shaft 43 through the medium of the yoke 70. Consequently, it will be seen that the support 44 together with its integral extension 44b is guided in a true rectilinear direction through the medium of the guide shafts 42 and 43, the construction, however, being such that the entire housing 44 and its extension 44b may be swung a limited distance about the shaft 42 as a pivot. This is accomplished by turning the shaft 72 which operation, through the medium of the pinion 71 will turn the gear 66. Rotation of the gear 66 will, through its threaded connection with the fixed shaft 67, cause the gear to travel vertically along the shaft thereby engaging one or the other of the thrust members 64 and 65 and, hence, raising or lowering the outer end of the extension 44b relatively to the guide shaft 43. As a result of this motion the housing support 44 will rotate a limited distance about the shaft 42, thereby swinging the work spindle 45 laterally or in a transverse direction relatively to the tool carrying spindle 17. This transverse motion of the work spindle will move the workpiece W transversely toward and from the grinding wheel T.

The shaft 72 has an extension 72a upon which is mounted a tubular handle 73 frictionally secured to the shaft extension by a friction tube 74. Keyed to the shaft extension 72a is a gear 75 mounted freely within a dial housing 73a formed on the inner end of the handle 73. The gear 75 meshes with a pinion 76 secured to a shaft 77 connected to a knob 79 through the medium of an interposed friction sleeve 78. Secured to the periphery of the dial housing 73a is a lug or ear 80 adapted to engage a pivoted detent 81 carried by a fixed portion of the housing support 44. From this construction it will be seen that by turning the handle 73 the shaft 72 will be rotated to raise the outer end of the housing extension 44b a predetermined distance, thereby moving the workpiece transversely a predetermined distance relatively to the grinding wheel. During this operation the dial together with the adjusting knob 79 and the gear 76 will turn as a unit around the axis of the shaft extension 72a and, hence, a rough feed of the workpiece relatively to the grinding wheel will be accomplished until the lug 89 engages the detent 81. From this point a fine feed of the workpiece relatively to the grinding wheel may be accomplished by turning the knob 79 to turn the shaft 72 through the medium of the meshing gears 76 and 75. The extent of this feed of the workpiece relatively to the grinding wheel, due to rotation of the shaft 72 and the pivotal motion imparted thereby to the housing support 44, will be determined by the dial reading. From this construction it will be seen that an accurate feed of the workpiece W transversely with respect to the longitudinal axis of the grinding wheel T may be accomplished by turning the handle 73 to first bring the inner surface of the workpiece into engagement, or approximately so, with the grinding wheel and thence completing accurately the desired depth of feed by turning the knob 79, it being understood that this knob together with the dial 73a are graduated to form a vernier dial adjusting means.

The projecting handle 73 not only provides a means for imparting pivotal motion to the work spindle support about the axis of the shaft 42 for feeding the workpiece transversely toward and from the grinding wheel T, but also provides a handle which may be grasped by the operator of the machine to shift the work spindle support 44 longitudinally upon the guide shafts 42 and 43 into and out of operative position with respect to the grinding wheel T, which movement of the work spindle support is accompanied by a longitudinal shiftable movement of the shaft 52 through the medium of the cam roller 58 and cam block 59 to positively open and close the collet 46.

The work spindle 45 is driven through the medium of an electric motor 82 bolted to the top of the work spindle housing. A conventional reduction drive may be provided comprising pulleys 83 and 84 connected by a belt 85, the latter being drivingly connected through the medium of a pulley 86 to a driven pulley 87 keyed to the spindle 45.

The longitudinal movement of the work spindle into operative position with respect to the grinding wheel is determined by means of suitable adjustable stop mechanism. In the embodiment shown in Fig. 1 this is accomplished by engagement of a lug 88 projecting from the housing support 44 and engageable with the end of an adjustable stop screw 89 threaded through a block 90 keyed within a guideway or slot 90a along the length of which the block 90 may be adjusted into any desired fixed position. A slightly different stop mechanism is illustrated in Figs. 2 and 8 comprising a stop bracket 91 secured to the housing support 44 and extending into position to engage the end of a stop screw 92 carrying a knurled disk 92a, the adjusting screw 92 being threaded through the upper end of a stop bracket 93. Extending through the lower end of the bracket are headed studs 94 interlocked with and slidable along a key slot or guideway 95. The bracket 93 may be rigidly secured in adjusted position with respect to the guideway 95 by clamping nuts 96 threaded onto the ends of the studs 94.

Referring to the construction shown in Figs. 1, 5 and 6, mechanism is provided for enabling the grinding wheel T to be dressed without necessitating its removal from the tool spindle 17. The wheel dresser comprises a C-shaped support arm 97 carrying at its outer end a diamond dresser 98 adjustably mounted within a supporting member 99 drilled to receive the supporting shank of the dressing tool, the latter being adjustable within the member 99 through the medium of a threaded connection with a knurled knob or disk 100 which may be turned to shift the dressing tool longitudinally within its support 99. The swinging arm 97, which carries the dressing tool, is pivoted at 101 to a slide bracket 102 which is adjustable longitudinally by means of ways 103 on a slide block 104. The parts 102 and 104 are secured together in adjusted position by means of a cap screw 105 which may be threaded into one of a plurality of tapped holes in the block 104. The slide block or member 104 is slotted transversely to embrace a vertically extending bracket 106 rigidly secured at its lower end to the bed plate 11. The slide member 104 may be adjusted transversely on the bracket 106 and held in fixed adjusted position by means of set screws 107. When it is desired to dress the grinding wheel T the supporting arm 97 may be swung down from its position shown in Fig. 5 to a horizontal position as shown in Fig. 1. Thereupon the knurled knob 100 may be turned to bring the diamond dresser 98 into engagement with the grinding wheel. The control switch 108 is then swung over to the position marked "Slow" in Fig. 1 thereby operating the electric motor 33 at slow speed so as to shift the tool spindle carrying slide 16 back and forth at slow speed during the dressing operation. After the grinding wheel has been properly dressed the supporting arm 97 is swung back to the position shown in Fig. 5 with the dressing tool 98 out of the way of the grinding wheel. Thereafter a grinding operation upon a tubular workpiece W may be performed by swinging the control switch 108 to the position marked "Fast" in Fig. 1, and during this time the slide 16 carrying the tool spindle 17 will be shifted back and forth upon the guide shafts 14 at normal speed.

I claim:

1. In a metal working machine, a spindle carrier, a work spindle mounted on said carrier and having means for holding a workpiece, a fixed support having spaced parallel guide shafts, means for guiding said carrier on said shafts for longitudinal travel in a rectilinear path, and means for swinging said carrier about the axis of one of said shafts for imparting bodily movement to the work spindle in a direction transverse to the longitudinal axis thereof.

2. In a metal working machine, a spindle carrier, a work spindle mounted on said carrier and having means for holding a workpiece, a fixed support having spaced parallel guide shafts, means for guiding said carrier on said shafts for longitudinal travel in a rectilinear path, means for swinging the carrier about the axis of one of the shafts and relatively to the other shaft to shift the work spindle transversely, and means for maintaining the carrier in fixed guiding relation to said last named shaft in all positions of the carrier.

3. In a metal working machine, a spindle carrier, a work spindle mounted on said carrier and having means for holding a workpiece, means mounted on said carrier for rotating the work spindle, a fixed support having spaced parallel guide shafts, means for guiding said carrier on said shafts for longitudinal travel in a rectilinear path, and means for swinging said carrier about the axis of one of said shafts for imparting bodily movement to the work spindle in a direction transverse to the longitudinal axis thereof.

4. In a metal working machine, a supporting base, a pair of stationary spaced horizontally extending guide shafts mounted thereon, a spindle carrier having a portion receiving one of said shafts and slidable thereon for guiding the carrier, said carrier also having relatively adjustable portions slidable on the other shaft for guiding the carrier, and means for adjusting one of said last named portions relatively to the other and to said last named shaft to swing the carrier about the axis of the first named shaft.

5. In a metal working machine, a rotary spindle, a supporting base, a pair of stationary spaced horizontally extending guide shafts mounted thereon, a spindle carrier supporting said spindle and having a portion receiving one of said shafts and slidable thereon for guiding the carrier, said carrier also having relatively adjustable portions slidable on the other shaft for guiding the carrier, and means for adjusting one of said last named portions relatively to the other and to said last named shaft to swing the carrier about the axis of the first named shaft.

6. In a metal working machine, a rotary spindle, driving means for the spindle, a supporting base, a pair of stationary spaced horizontally extending guide shafts mounted thereon, a spindle carrier supporting said spindle and driving means and having a portion receiving one of said shafts and slidable thereon for guiding the carrier, said carrier also having relatively adjustable portions slidable on the other shaft for guiding the carrier, and means for adjusting one of said last named portions relatively to the other and to said last named shaft to swing the carrier about the axis of the first named shaft.

7. In a metal working machine, a rotary work spindle having a work holder, a supporting base, a pair of parallel horizontal guide shafts mounted in fixed position on said base, a support for said work spindle within which the spindle is revoluble, a guide fixed to said support and slidable on one of the shafts and also pivoted thereto, a second guide slidable on the other shaft, said support having a portion mounted on said second guide and adjustable relatively thereto into various positions fixed with respect to said second guide, and means for adjusting said portion of the support relatively to the second guide to impart pivoted movement to the support.

8. In a metal working machine, a rotary work spindle having a work holder, means for driving said work spindle, a supporting base, a pair of parallel horizontal guide shafts mounted in fixed position on said base, a support for said work spindle and spindle driving means within which the spindle is revoluble, a guide fixed to said support and slidable on one of the shafts and also pivoted thereto, a second guide slidable on the other shaft, said support having a portion mounted on said second guide and adjustable relatively thereto into various positions fixed with respect to said second guide, and means for adjusting said portion of the support relatively to the second guide to impart pivotal movement to the support.

9. In a metal working machine, a rotary work spindle having a work holder, a supporting base, a pair of parallel horizontal guide shafts mounted in fixed position on said base, a support for said work spindle within which the spindle is revoluble, a guide fixed to said support and slidable on one of the shafts and also pivoted thereto, a second guide slidable on the other shaft, said support having a unitary extension mounted on said second guide and adjustable vertically relatively thereto into various positions fixed with respect to said second guide, and means for adjusting said unitary extension of the support relatively to the second guide to impart pivotal movement to the support and to shift the spindle transversely.

10. In a metal working machine, a rotary work spindle, means for driving the same, a support for said spindle and driving means, a pair of parallel horizontal stationary guide shafts, a guide fixed to said support and bored to slidingly receive one of the shafts, a second guide slidingly receiving the other shaft, an extension fixed to the support mounted on the second guide for vertical adjustment relative thereto, mechanism for adjusting said extension vertically relative to the second guide to rotate the support about the axis of said first named shaft, and a rotatable handle on said support in position to be manually grasped for sliding the support on said shafts, and means connected to the handle for operating said adjusting mechanism upon rotation of the handle.

11. In a metal working machine, a rotary work spindle, means for driving the same, a support for said spindle and driving means, a pair of parallel horizontal stationary guide shafts, a guide fixed to said support and bored to slidingly receive one of the shafts, a second guide slidingly receiving the other shaft, an extension fixed to the support mounted on the second guide for vertical adjustment relative thereto, mechanism including gearing for adjusting said extension vertically relative to the second guide to rotate the support about the axis of said first named shaft, and a rotatable handle on said support in position to be manually grasped for sliding the support on said shafts, and shaft means connected to the handle for operating said adjusting mechanism upon rotation of the handle.

12. In a metal working machine, a rotary work spindle, a work holding device carried by said spindle, a support for said spindle, means for guiding said support for travel in a straight line path to shift the spindle toward and from a tool, a longitudinally shiftable member connected to said work holding device, mechanism operative by the travel of said support in opposite directions for positively shifting said member in opposite directions to shift said device to grip and release the work, said mechanism including a longitudinally slidable shaft having spaced devices adapted to coact with said member to shift the same in opposite directions, and cam controlled means for imparting sliding movement to said shaft in opposite directions.

13. In a metal working machine, a rotary work spindle, a work holding device carried by said spindle, a support for said spindle, means for guiding said support for travel in a straight line path to shift the spindle toward and from a tool, a longitudinally shiftable member connected to said work holding device, mechanism operative by the travel of said support in opposite directions for positively shifting said member in opposite directions to shift said device to grip and release the work, said mechanism including a longitudinally slidable shaft having spaced devices adapted to coact with said member to shift the same in opposite directions, gear means for imparting sliding movement in opposite directions to said shaft, and cam means for operating said gear means.

14. In a metal working machine, a base, a rotary work spindle, a support for said spindle slidable longitudinally in opposite directions on said base, a work holder carried by the spindle, a shiftable member extending through the spindle for opening and closing said holder, a sliding shaft having spaced devices movable with the shaft into positions to shift said member in opposite directions, a cam member carried by the base, and means engageable with said cam member for sliding said shaft to open and close the work holder upon sliding the support on said base.

15. In a metal working machine, a base, a rotary work spindle, a support for said spindle slidable longitudinally in opposite directions on said base, a work holder carried by the spindle, a shiftable member extending through the spindle for opening and closing said holder, a sliding shaft having spaced devices movable with the shaft into positions to shift said member in opposite directions, rack and gear means for sliding said shaft, a cam member carried by the base, and means carried by the support and engageable with said cam member during sliding movement of the support for operating said rack and gear means.

16. In a metal working machine, a base, a rotary work spindle, a work holder carried by the spindle, a slidable support for said spindle, a pair of parallel longitudinal guide shafts fixed to the base, a guide on the support embracing and slidable on one guide shaft, a second guide embracing and slidable on the other guide shaft, an extension fixed to the support and supported on the second guide for vertical adjustment relative thereto, mechanism for effecting such adjustment and for maintaining the extension and second guide in fixed relation in all adjusted positions of the extension, said support pivoted about the axis of the first named guide shaft during said vertical adjustment of the extension, stop means for limiting travel of the support into operative position, mechanism operative by the travel of the support toward and from said stop mechanism for positively shifting said work holder to grip and release the work, a rotatable handle projecting from the support and adapted to be manually grasped for sliding said support on said guide shafts, and means connected to said handle for operating said first named mechanism upon rotation of the handle to adjust said extension vertically relatively to said second guide thereby to shift the work spindle transversely of its axis.

17. In a metal working machine, a work support, a slide carrying said support and shiftable longitudinally of the machine, spaced longitudinal guide shafts for said slide, and means for swinging said slide about the axis of one guide shaft relatively to the other guide shaft while maintaining the slide in positive guiding relation to both guide shafts.

18. In a metal working machine, a rotary spindle, a slide carrying said spindle and shiftable longitudinally in the direction of the spindle axis, guide means for the slide including spaced longitudinal guide members, and means for swinging the slide about the axis of one guide member while maintaining the slide in positive guiding relation to both guide members.

19. In a metal working machine, a work support, a slide carrying said support and shiftable longitudinally of the machine, spaced longitudinal guide shafts for said slide, means for shifting said slide transversely to one of said guide shafts to move the work support transversely to the direction of travel of said slide, and means for maintaining said slide in positive guiding relation to both of said shafts as the slide is shifted transversely.

HARRY L. KNAPP.